Figure 1:
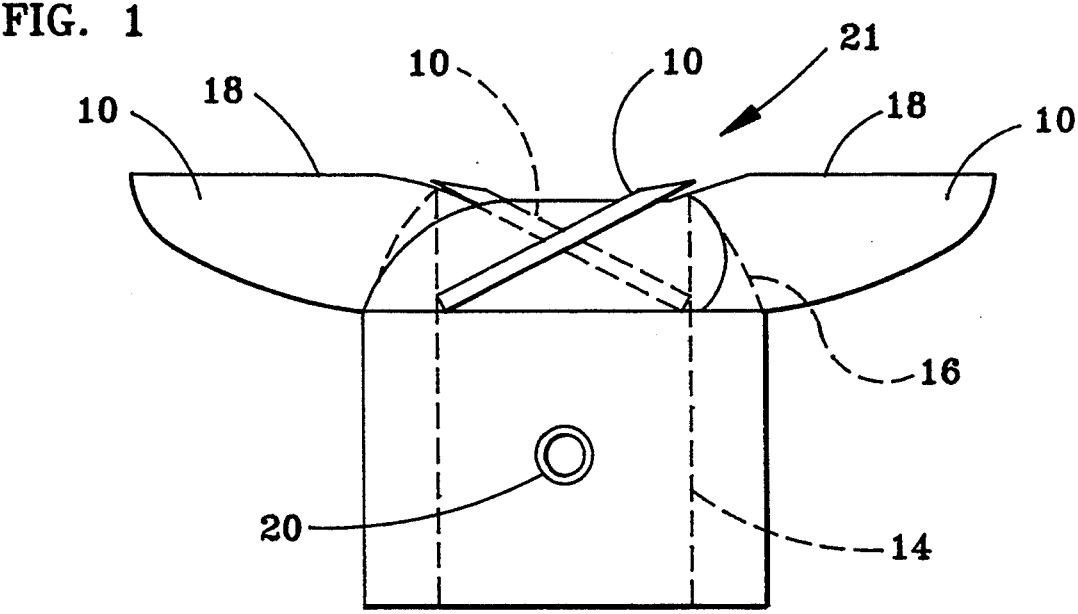

United States Patent [19]

Schaaf

[11] Patent Number: 5,338,559
[45] Date of Patent: Aug. 16, 1994

[54] METHOD AND APPARATUS FOR MAKING EXPANDED FOOD STUFFS

[76] Inventor: Heinz-Josef Schaaf, Otto-Hahn-Strasse, D-6277 Bad Camberg, Fed. Rep. of Germany

[21] Appl. No.: 39,094
[22] PCT Filed: Aug. 6, 1992
[86] PCT No.: PCT/EP92/01783
  § 371 Date: Apr. 9, 1993
  § 102(e) Date: Apr. 9, 1993
[87] PCT Pub. No.: WO93/03912
  PCT Pub. Date: Mar. 4, 1993

[30] Foreign Application Priority Data

Aug. 22, 1991 [DE] Fed. Rep. of Germany ....... 4127811

[51] Int. Cl.$^5$ ............................. A23P 1/00; B26D 5/00
[52] U.S. Cl. ....................................... 426/448; 83/592; 425/311; 425/313; 426/516; 426/518
[58] Field of Search ............... 426/448, 516, 518; 425/311, 313; 83/171, 591, 592; 241/82.1, 82.4, 82.7, 292.1

[56] References Cited

U.S. PATENT DOCUMENTS 3,861,844  1/1975  Miller ..................... 425/311
4,240,779 12/1980  Turk ...................... 426/313

*Primary Examiner*—George Yeung
*Attorney, Agent, or Firm*—George W. Dishong

[57] ABSTRACT

The invention relates to a method of making expanded foodstuffs which are extruded and cut, reduced pressure being applied at the nozzle outlet, said method being distinguished in that the cutting blades are set in such a manner that the surface of the cutting blades is configured in the manner of a ship's screw for generating reduced pressure at the point at which the extrudate emerges from the nozzle.

19 Claims, 2 Drawing Sheets

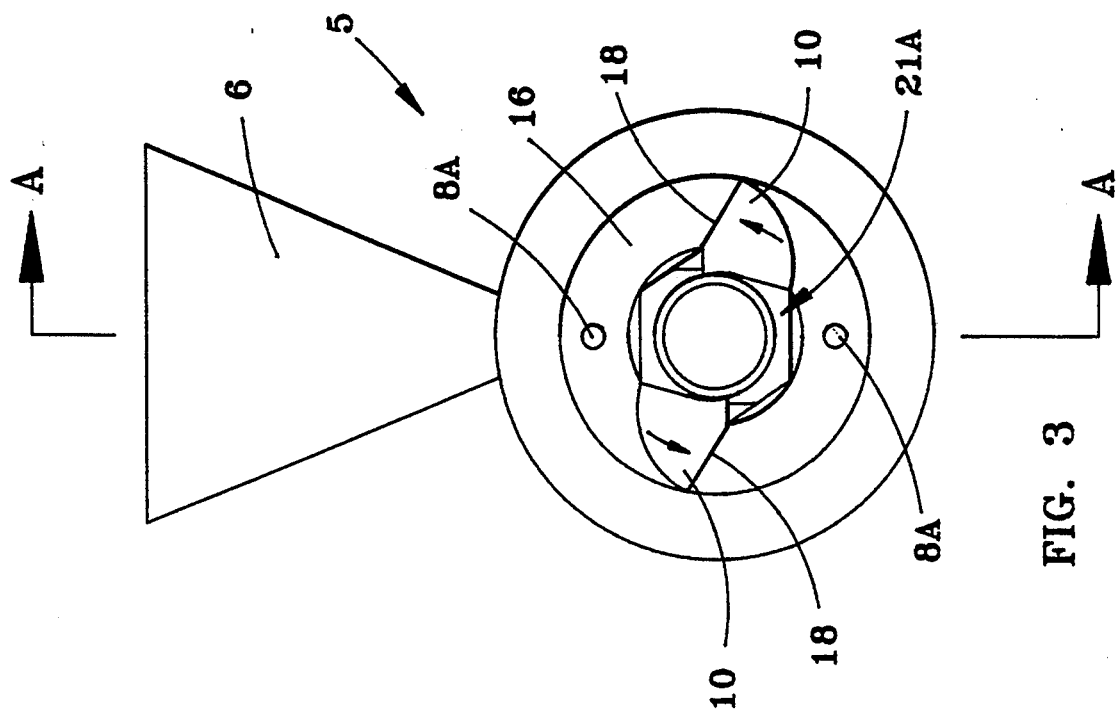
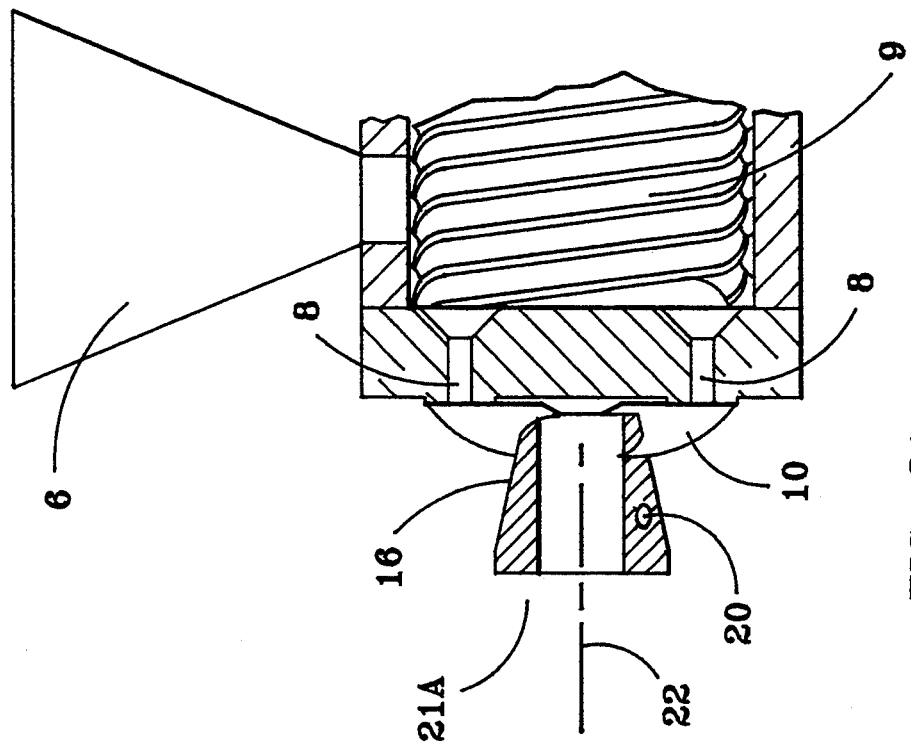

METHOD AND APPARATUS FOR MAKING EXPANDED FOOD STUFFS

DESCRIPTION

The invention relates to a method of making expanded products, the products being extruded and cut and reduced pressure being applied at the nozzle outlet.

The subject of the invention is also an apparatus for making expanded products comprising an extruder, including screw, nozzle insert and cutting blades, and a device generating a reduced pressure in the region of the nozzle outlet.

Constructional solutions have already been developed in which on the one hand direct extrusion was carried out to the hot medium, with the advantage of a particularly favourable expansion, and on the other hand a solution in which the expansion was increased not by heat but by reduced pressure (vacuum).

To establish the reduced pressure (vacuum), to maintain the reduced pressure in front of the nozzle a considerable apparatus expenditure was hitherto necessary, that is a closed system including a vacuum pump, condenser, discharge locks, etc.

The invention is based on the problem firstly of overcoming the apparatus expenditure of such a closed system with at least equally good or better results, and secondly of offering and improving solutions for the extrusion, for example simply into the ambient air.

It is further known that in the extrusion into hot fat effects which of course improve the texture and the expansion occur.

This problem is solved according to the invention in a method of the type mentioned at the beginning in that the cutting blades are set so that the surface of the cutting blades is configured in the manner of a ship's screw for generate, rig reduced pressure at the point at which the extrudate emerges from the nozzle.

Anyone of ordinary skill in the art of extrusion of having ordinary engineering knowledge understands of the relationship of the performance of a "ship's screw" relative to the apparatus defined herein for the expansion of products and particularly foodstuffs. Further, any ordinarily skilled person who understands the technology of extrusion understands that the feature of traction of a ship's screw is the feature used to advantage in the present invention. There needs to be nothing additional said by way of explanation of the function of a ship's screw.

The design may be configured for traction (in contrast to the more frequent configuration in ship's screw designs, which operate by thrust).

The blade (vanes) may be made adjustable.

The blade (screw vanes) may operate with a straight generatrix.

The application of the method to the production of foodstuffs is to be regarded as particularly advantageous.

The solution as regards the apparatus proceeds from an apparatus of the aforementioned type and is distinguished in that the cutting blades arranged radially about a rotating axis are set at such an angle and have a profile which is configured in such a manner that reduced pressure is generated at the nozzle outlet of the extrudate.

It is possible by the step of the invention to achieve particular effects when the cutting blade passes directly by the nozzle in the oil. The direct cutting takes place then directly at the nozzle in hot fat and this leads to an enlargement of the surface; the heat transfer to the product is further enhanced.

Due to the preferable configuration of the radially formed cutting blade rotating about an axis in a manner similar to a ship's screw, at the usual speeds of rotation (in air and in particular in fluid) a considerable pumping effect occurs depending upon the annular position of the cutting blades.

The pumping effect produces a corresponding partial vacuum directly at the cutting edge of the blades. Preferably, it is possible to produce venturi-like accelerating section between every two propeller blades.

On extrusion into hot fluid the reduced pressure directly at the nozzle outlet effects a considerable increase in expansion and an adequately great expansion at considerably lower dough temperatures, with the advantages involved.

Attention is additionally drawn to the propeller theory for the exact construction of the propeller (ship's screw) vanes, the pressure and flow distribution, etc. (for example Lueger, vol. 12, 1967, p. 457–464).

A very particular advantage is that to maintain the reduced pressure in front of the nozzle the considerable apparatus expenditure, such as closed system, vacuum pump, condenser, discharge locks, etc., can be dispensed with. It is surprising that all the advantages of the vacuum extrusion and all the advantages of the step of extruding into hot medium are applicable here.

The effect is even measurable with the type of extrusion hitherto, i.e. extrusion into air; by optimizing the cutting blade form from the fluid mechanical point of view considerable improvements can be obtained here.

It is possible for (as usual) the common propeller axis of the cutting blades to be provided parallel spaced from the nozzle axis.

According to another embodiment it is preferably possible for a plurality of nozzle outlets to be arranged in concentric ring array. The blades are then likewise arranged concentrically to said ring array and pass closely by the nozzle outlets.

In the extrusion into hot medium, for example oil or fat, the blades are arranged to skim the nozzle directly.

Figure 2:
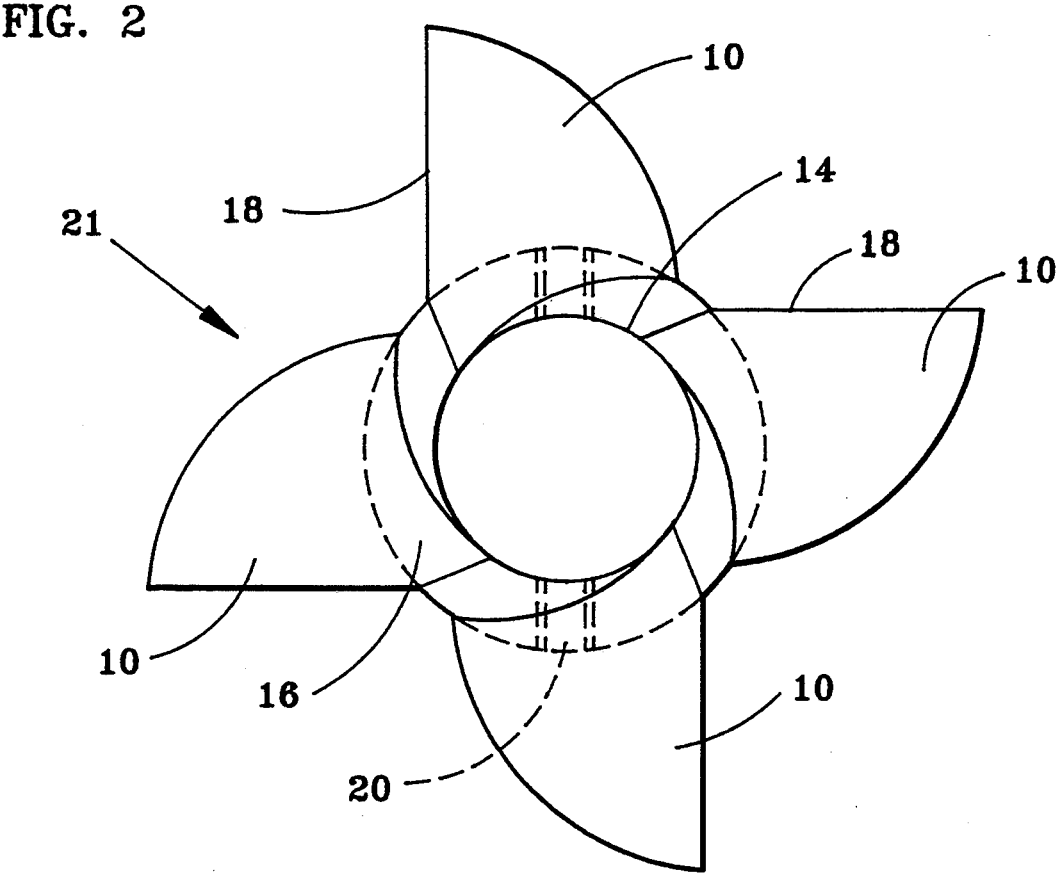

An example of embodiment of the invention will now be explained in detail with the aid of the attached drawings, wherein FIG. 1 is a side elevation, FIG. 2 is a plan elevation of a blade head having four blades;

FIG. 3 is a view from the shaft drive end of the rotating device of the improved apparatus for making expanded foodstuffs; and FIG. 3A is a cross-sectional view of the apparatus illustrating the feed screw, nozzle and rotating device relationship.

Four cutting blades 10, which in the example of embodiment are planar and at uniform intervals, are mounted in the example of embodiment on a straight hub 14 which tapers conically upwardly at 16. The setting of the cutting blades 10 is readily apparent in the side elevation at 14. The angle may for example be 30° to the horizontal. The cutting blades have straight cutting edges 18 which are intended to cut along the rod close to the nozzle outlet opening 8a.

The rear side of the blades is curved. The entire blade head is held by screwing a threaded pin into the threaded bore 20.

With reference to FIGS. 3 and 3A, apparatus 5 is shown having feed hopper 6 into which expandable mixture is placed. From hopper 6 the mixture enters the chamber of apparatus 5 wherein the mixture is moved and pressurized by feed screw 9. The mixture is thus pushed through the means for creating the extrudate 8 (extrudate being the mixture following passage through the nozzle or nozzles 8). Most typically a plurality of nozzles 8 is used as the means for creating the extrudate and they may be located concentrically about axis of rotation 22. At the emerging of the extrudate at the output end 8a of nozzles 8, i.e., the emergent section of the extruder device, there is created a reduced pressure zone or region. This reduced pressure is created by the rotation of the rotational device 21a (rotational device 21 of FIGS. 1 and 2 have four blades) which further is used to cut the extrudate as it emerges from the outlet 8a of each of nozzles 8.

The effect can be demonstrated in a trial operation of these blades in water. The water may be employed at different temperatures to optimize the angular position of the blades by observation of the occurrence of the reduced pressure in specific regions. The modification is effected at different speeds of rotation, i.e. cutting speeds. It is observed in which zone of the cutting edge the reduced pressure arises. Exact values may even be read from the vapour pressure table. In such model tests the reduced pressure may also be brought to the position where it is desired. The reduced pressure should always occur as the exit of the nozzle.

To increase the efficiency or the reduced pressure, in a further development of the invention the ship's screw configuration may be arranged in a sort of nozzle cowl (the blades are of course free).

I claim:

1. In an apparatus for making expanded foodstuffs of the type comprising: means for feeding an expandable mixture in to said apparatus; means for extruding said expandable mixture and creating thereby upon emergence from said means for extruding, extrudate from said expandable mixture, wherein the improvement comprises:
   means for generating a region of reduced pressure substantially proximate an emerging section of said means for extruding; and
   means for cutting said extrudate substantially upon emergence of said extrudate from said means for creating extrudate.

2. In the apparatus for making expanded foodstuffs according to claim 1 wherein said means for generating a region of reduced pressure and said means for cutting said extrudate substantially upon emergence of said extrudate comprises a rotatable device which when in rotation, generates a region of reduced pressure proximate each said at least one nozzle and wherein said rotatable device further comprises a plurality of cutting edges which, when in rotation each said cutting edge passes proximate to said emergent section of each said nozzle.

3. In the apparatus for making expanded foodstuffs according to claim 2 wherein each said plurality of cutting edges are arranged radially about a rotating axis and each of said cutting edge is contiguous with and a part of each blade of a plurality of rotating blades each said blade set at an angle and having a surface profile configured in such a manner as to generate upon rotation thereof, said region of reduced pressure.

4. In the apparatus for making expanded foodstuffs according to claim 2 wherein said rotatable device is substantially configured in the manner of a ship screw and which when in rotation creates said region of reduced pressure.

5. In the apparatus for making expanded foodstuffs according to claim 3 wherein each of said at least one nozzle is positioned concentrically about said axis of rotation of said rotatable device.

6. Apparatus for making expanded foodstuffs comprising:
   means for extruding an expandable mixture, said means for extruding comprising means for feeding said expandable mixture into said apparatus, means for moving and pressurizing said expandable mixture from said means for feeding into a means for creating extrudate from said expandable mixture;
   means for generating a region of reduced pressure substantially proximate an emerging section of said means for creating extrudate; and
   means for cutting said extrudate substantially upon emergence of said extrudate from said means for creating extrudate.

7. Apparatus for making expanded foodstuffs according to claim 5 wherein said means for moving and pressurizing is a feed screw, said means for creating extrudate is at least one nozzle each nozzle having a selected cross-sectional geometry, said means for generating a region of reduced pressure and said means for cutting said extrudate substantially upon emergence of said extrudate, being a rotatable device which when in rotation about an axis, generates a region and reduced pressure proximate each of said at least one nozzle and wherein said rotatable device further comprises a plurality of cutting edges which, when in rotation each of said cutting edge passes proximate to said emergent section of each said nozzle.

8. Apparatus for making expanded foodstuffs according to claim 7 wherein each said plurality of cutting edges are arranged radially about said axis of rotation and each said cutting edge is contiguous with and a part of each blade of a plurality of rotating blades, each said blade set at an angle and having a surface profile configured in such a manner as to generate upon rotation thereof, said region of reduced pressure.

9. Apparatus for making expanded foodstuffs according to claim 7 wherein said rotatable device is substantially configured in the manner of a ship screw and which when in rotation creates said region of reduced pressure.

10. Apparatus for making expanded foodstuffs according to claim 7 wherein each of said at least one nozzle is positioned concentrically about said axis of rotation of said rotatable device.

11. Apparatus for making expanded foodstuffs according to claim 8 wherein each said at least one nozzle is positioned concentrically about said axis of rotation of said plurality of rotating blades.

12. Apparatus for making expanded foodstuffs according to claim 9 wherein each said at least one nozzle is positioned concentrically about said axis of rotation of said plurality of rotating blades.

13. Apparatus for making expanded foodstuffs according to claim 7 wherein each said plurality of cutting edges are formed rectilinearly in a plane perpendicular to said axis of rotation.

14. Apparatus for making expanded foodstuffs according to claim 8 wherein each said plurality of cutting edges are formed rectilinearly in a plane perpendicular to said axis of rotation and wherein each said blade has a planar surface.

15. Method of making expanded foodstuffs, said method comprising:
   feeding an expandable mixture into an apparatus for making expanded foodstuffs;
   extruding said expandable mixture, said step of extruding comprising the steps of moving and pressurizing said expandable mixture into a means for creating extrudate thereby creating, upon emergence of said moved and pressurized mixture, an extrudate from said expandable mixture;
   generating a region of reduced pressure substantially proximate an emerging section of said means for creating extrudate; and
   cutting said extrudate substantially upon emergence of said extrudate from said means for creating extrudate.

16. The method of making expanded foodstuffs according to claim 15 wherein said step of generating a region of reduced pressure and said step of cutting said extrudate are performed by a rotatable device which when in rotation about an axis, generates said region of reduced pressure and cuts said extrudate.

17. The method of making expanded foodstuffs according to claim 16 wherein said rotatable device has construction similar to a ship's screw having a plurality of blades, a hub and which, when in rotation about an axis, generates said region of reduced pressure and cuts said extrudate.

18. The method of making expanded foodstuffs according to claim 16 further comprising immersing, into heated fluid, said means for creating extrudate thereby creating, upon emergence of said moved and pressurized mixture, said extrudate into said heated fluid and said steps of generating a region of reduced pressure and cutting being carried out within said heated fluid.

19. The method of making expanded foodstuffs according to claim 17 further comprising the step of adjusting an angle of each said blade relative to said axis of rotation and wherein said blades are angularly adjustable.

* * * * *